United States Patent
Zhou et al.

(10) Patent No.: US 10,317,217 B2
(45) Date of Patent: Jun. 11, 2019

(54) INDOOR NAVIGATION METHOD OF HANDHELD TERMINAL, HANDHELD TERMINAL, AND STORAGE MEDIUM

(71) Applicant: PING AN TECHNOLOGY (SHENZHEN) CO., LTD., Shenzhen (CN)

(72) Inventors: Bao Zhou, Shenzhen (CN); Zhongcheng Lai, Shenzhen (CN); Guoqiang Rong, Shenzhen (CN)

(73) Assignee: PING AN TECHNOLOGY (SHENZHEN) CO., LTD., Shenzhen (CN)

( * ) Notice: Subject to any disclaimer, the term of this patent is extended or adjusted under 35 U.S.C. 154(b) by 0 days.

(21) Appl. No.: 16/084,225

(22) PCT Filed: Jun. 21, 2017

(86) PCT No.: PCT/CN2017/089419
§ 371 (c)(1),
(2) Date: Sep. 12, 2018

(87) PCT Pub. No.: WO2017/219992
PCT Pub. Date: Dec. 28, 2017

(65) Prior Publication Data
US 2019/0072394 A1    Mar. 7, 2019

(30) Foreign Application Priority Data

Jun. 22, 2016    (CN) .......................... 2016 1 0460576

(51) Int. Cl.
*H04W 4/00* (2018.01)
*G01C 21/20* (2006.01)
(Continued)

(52) U.S. Cl.
CPC .......... *G01C 21/206* (2013.01); *G06F 16/29* (2019.01); *G06K 7/1443* (2013.01); *H04W 4/024* (2018.02); *H04W 64/003* (2013.01)

(58) Field of Classification Search
CPC .. G01C 21/206; H04W 64/00; H04W 64/003; H04W 4/024; G06K 7/1443
See application file for complete search history.

(56) References Cited

U.S. PATENT DOCUMENTS

2008/0288165 A1    11/2008    Suomela et al.
2010/0127883 A1    5/2010    Chou
(Continued)

FOREIGN PATENT DOCUMENTS

CN    102135429 A    7/2011
CN    103533644 A    1/2014
(Continued)

*Primary Examiner* — Omoniyi Obayanju
(74) *Attorney, Agent, or Firm* — Gokalp Bayramoglu

(57) ABSTRACT

An indoor navigation method of a handheld terminal, which includes: after receiving an instruction, obtaining an image within a scope of a lens, performing analysis on a barcode of a barcode label in the image, obtaining identifier information of each barcode label, selecting color blocks from at least two barcode labels; calculating coordinates of each of the color blocks in a pixel coordinate system according to a position of each selected color block in the image; and calculating coordinates corresponding to each of the color blocks in a coordinate system on the basis of association data of identifier information of the barcode labels and coordinates of the color blocks in the coordinate system according to a barcode label at which each selected color block is located, and calculating coordinates of the handheld terminal in the coordinate system according to a coordinate calculation rule.

20 Claims, 9 Drawing Sheets

(51) Int. Cl.
   *H04W 4/024*   (2018.01)
   *G06F 16/29*   (2019.01)
   *G06K 7/14*    (2006.01)
   *H04W 64/00*   (2009.01)

(56) References Cited

U.S. PATENT DOCUMENTS

2012/0197519 A1     8/2012  Richardson
2014/0236475 A1*    8/2014  Venkatraman ....... G01C 21/206
                                                         701/420
2016/0345137 A1*   11/2016  Ruiz ..................... H04W 4/04

FOREIGN PATENT DOCUMENTS

| CN | 104019810 A | 9/2014 |
| CN | 105222774 A | 1/2016 |
| CN | 105424031 A | 3/2016 |
| CN | 106197417 A | 12/2016 |

\* cited by examiner

INDOOR NAVIGATION METHOD OF HANDHELD TERMINAL, HANDHELD TERMINAL, AND STORAGE MEDIUM

CROSS REFERENCE TO RELATED APPLICATIONS

This application is a national phase entry of the international application PCT/CN2017/089419, filed on Jun. 21, 2017, which claims priority to Chinese Patent Application No. 201610460576.5, filed with the Chinese Patent Office on Jun. 22, 2016 and entitled "INDOOR NAVIGATION METHOD OF HANDHELD TERMINAL AND HANDHELD TERMINAL", which is incorporated herein by reference in its entirety.

TECHNICAL FIELD

This application relates to the technical field of navigation, and in particular, to an indoor navigation method of a handheld terminal, a handheld terminal, and a storage medium.

BACKGROUND

At present, when a user uses a handheld terminal, some indoor places are large and a distribution condition of regions is relatively complicated, so that it is difficult to find out a target area or position after the user enters into these places. Currently, although there are some solutions for handheld terminal navigation in indoor places, these solutions have high requirements on hardware and software in these places. In addition, these solutions cannot quickly and accurately calculate a precise real-time position of handheld terminals, resulting in lower navigation precision.

SUMMARY

This application provides an indoor navigation method of a handheld terminal, a handheld terminal, and a storage medium, which aim at achieving precise indoor navigation of the handheld terminal at low costs.

To achieve the above purpose, the present invention provides an indoor navigation method of a handheld terminal, the method including the steps of:

after receiving an indoor navigation instruction sent by a user, controlling, by the handheld terminal, a camera of the handheld terminal to obtain an image within a scope of a lens, performing data analysis on a barcode of a barcode label that is preset in a preset indoor position in the image within the scope of the lens, obtaining identifier information of each barcode label in the image within the scope of the lens, and selecting a preset quantity of color blocks from at least two barcode labels in the image within the scope of the lens according to a preset color block selection rule;

calculating coordinates corresponding to each of the color blocks in a pixel coordinate system according to a position of each selected color block in the image within the scope of the lens, and calculating coordinates corresponding to each of the color blocks in a world coordinate system on the basis of preset association data of identifier information of the barcode labels and coordinates of the color blocks in the world coordinate system according to a barcode label at which each selected color block is located; and calculating coordinates of the handheld terminal in the world coordinate system on the basis of the coordinates corresponding to each of the selected color blocks in the pixel coordinate system and in the world coordinate system according to a preset coordinate calculation rule, to obtain a position of the handheld terminal.

A handheld terminal for indoor navigation, the handheld terminal including:

an obtaining module, configured to control, when an indoor navigation instruction sent by a user is received, a camera of the handheld terminal to obtain an image within a scope of a lens, perform data analysis on a barcode of a barcode label that is preset in a preset indoor position in the image within the scope of the lens, obtain identifier information of each barcode label in the image within the scope of the lens, and select a preset quantity of color blocks from at least two barcode labels in the image within the scope of the lens according to a preset color block selection rule;

a calculation module, configured to calculate coordinates corresponding to each of the color blocks in a pixel coordinate system according to a position of each selected color block in the image within the scope of the lens, and calculate coordinates corresponding to each of the color blocks in a world coordinate system on the basis of preset association data of identifier information of the barcode labels and coordinates of the color blocks in the world coordinate system according to a barcode label at which each selected color block is located; and a positioning module, configured to calculate coordinates of the handheld terminal in the world coordinate system on the basis of the coordinates corresponding to each of the selected color blocks in the pixel coordinate system and in the world coordinate system according to a preset coordinate calculation rule, to obtain a position of the handheld terminal.

A handheld terminal, including user interaction equipment, storage equipment, a camera, and a processor, where the user interaction equipment is configured to implement interaction between the terminal and a user, the storage equipment stores a computer-readable code instruction, and the computer-readable code instruction is executed by the processor to implement the steps of:

after receiving an indoor navigation instruction sent by a user, controlling a camera of the handheld terminal to obtain an image within a scope of a lens, performing data analysis on a barcode of a barcode label that is preset in a preset indoor position in the image within the scope of the lens, obtaining identifier information of each barcode label in the image within the scope of the lens, and selecting a preset quantity of color blocks from at least two barcode labels in the image within the scope of the lens according to a preset color block selection rule;

calculating coordinates corresponding to each of the color blocks in a pixel coordinate system according to a position of each selected color block in the image within the scope of the lens, and calculating coordinates corresponding to each of the color blocks in a world coordinate system on the basis of preset association data of identifier information of the barcode labels and coordinates of the color blocks in the world coordinate system according to a barcode label at which each selected color block is located; and calculating coordinates of the electronic equipment in the world coordinate system on the basis of the coordinates corresponding to each of the selected color blocks in the pixel coordinate system and in the world coordinate system according to a preset coordinate calculation rule, to obtain a position of the electronic equipment.

A storage medium having a computer-executable instruction, the storage medium being executed by one or more processors to implement the operations of:

after receiving an indoor navigation instruction sent by a user, controlling a camera of a handheld terminal to obtain an image within a scope of a lens, performing data analysis on a barcode of a barcode label that is preset in a preset indoor position in the image within the scope of the lens, obtaining identifier information of each barcode label in the image within the scope of the lens, and selecting a preset quantity of color blocks from at least two barcode labels in the image within the scope of the lens according to a preset color block selection rule;

calculating coordinates corresponding to each of the color blocks in a pixel coordinate system according to a position of each selected color block in the image within the scope of the lens, and calculating coordinates corresponding to each of the color blocks in a world coordinate system on the basis of preset association data of identifier information of the barcode labels and coordinates of the color blocks in the world coordinate system according to a barcode label at which each selected color block is located; and calculating coordinates of the electronic equipment in the world coordinate system on the basis of the coordinates corresponding to each of the selected color blocks in the pixel coordinate system and in the world coordinate system according to a preset coordinate calculation rule, to obtain a position of the electronic equipment.

According to the indoor navigation method of a handheld terminal, the handheld terminal, and the storage medium provided in the present invention, identifier information of a barcode label that is preset in a preset indoor position in the image within the scope of the lens is obtained by using the camera of the handheld terminal, a preset quantity of color blocks is selected from at least two barcode labels in the image within the scope of the lens, coordinates corresponding to each of the color blocks in a pixel coordinate system and in a world coordinate system are calculated, and a position of the handheld terminal is obtained through calculation on the basis of the coordinates corresponding to each of the selected color blocks in the pixel coordinate system and in the world coordinate system according to a preset coordinate calculation rule. Since indoor navigation can be performed by using only the camera of the handheld terminal and a barcode label preset in a preset indoor position, requirements on software and hardware are relatively low, and a precise real-time position of the handheld terminal can be quickly and accurately calculated according to synthetical calculation of the coordinates of the color blocks of the barcode label that is preset in the preset indoor position in the pixel coordinate system and in the world coordinate system, thereby improving indoor navigation precision.

The implementation of objectives, functional characteristics, and advantages of the present invention will be further described with reference to the accompanying drawings.

DETAILED DESCRIPTION OF THE EMBODIMENTS

It should be understood that the described embodiments are merely used to explain the present invention, rather than to limit the present invention.

Figure 1:
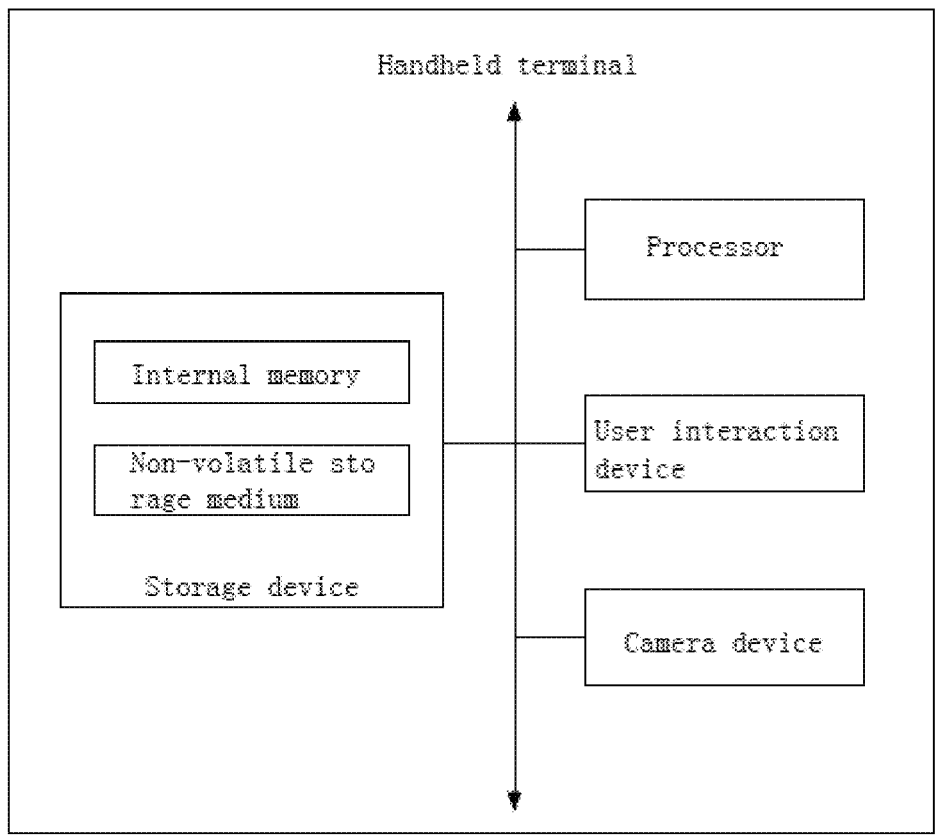
FIG. 1 is a hardware block diagram of a handheld terminal according to this application.

This application provides an indoor navigation method of a handheld terminal. As shown in FIG. 1, FIG. 1 is a hardware block diagram of a handheld terminal applicable to the indoor navigation method. The handheld terminal includes a processor, storage equipment, user interaction equipment, and a camera that are connected via a bus system. The processor is used to provide computing and control capabilities to support the operation of the entire handheld terminal. The storage equipment is used to store data, instruction codes, and the like. In some embodiments, the storage equipment includes a non-volatile storage medium and an internal memory. The non-volatile storage medium is used to store an operating system, a database, and at least one computer-executable instruction of the handheld terminal. The computer-executable instruction is executed by the processor to implement the indoor navigation method provided in the embodiments of this application. The internal memory provides a caching environment for the operating system and computer-executable instructions. The user interaction equipment is used to implement interaction between a user and the handheld terminal. For example, the user inputs a touch instruction to the handheld terminal or the handheld terminal displays result data of the above indoor navigation method to the user. The camera has a camera. When the indoor navigation method provided in this embodiment of this application is implemented, the camera may receive a control instruction from the processor and obtain an image of a barcode label inside a room based on the control instruction.

Those skilled in the art may understand that the structure shown in FIG. 1 is only a block diagram of a part of the structure related to the solution of this application and does not constitute a limitation on a server to which the solution of this application is applied. Specifically, the handheld terminal may include more or less components than that shown in the figures, combine some components, or have different component arrangements.

Figure 2:
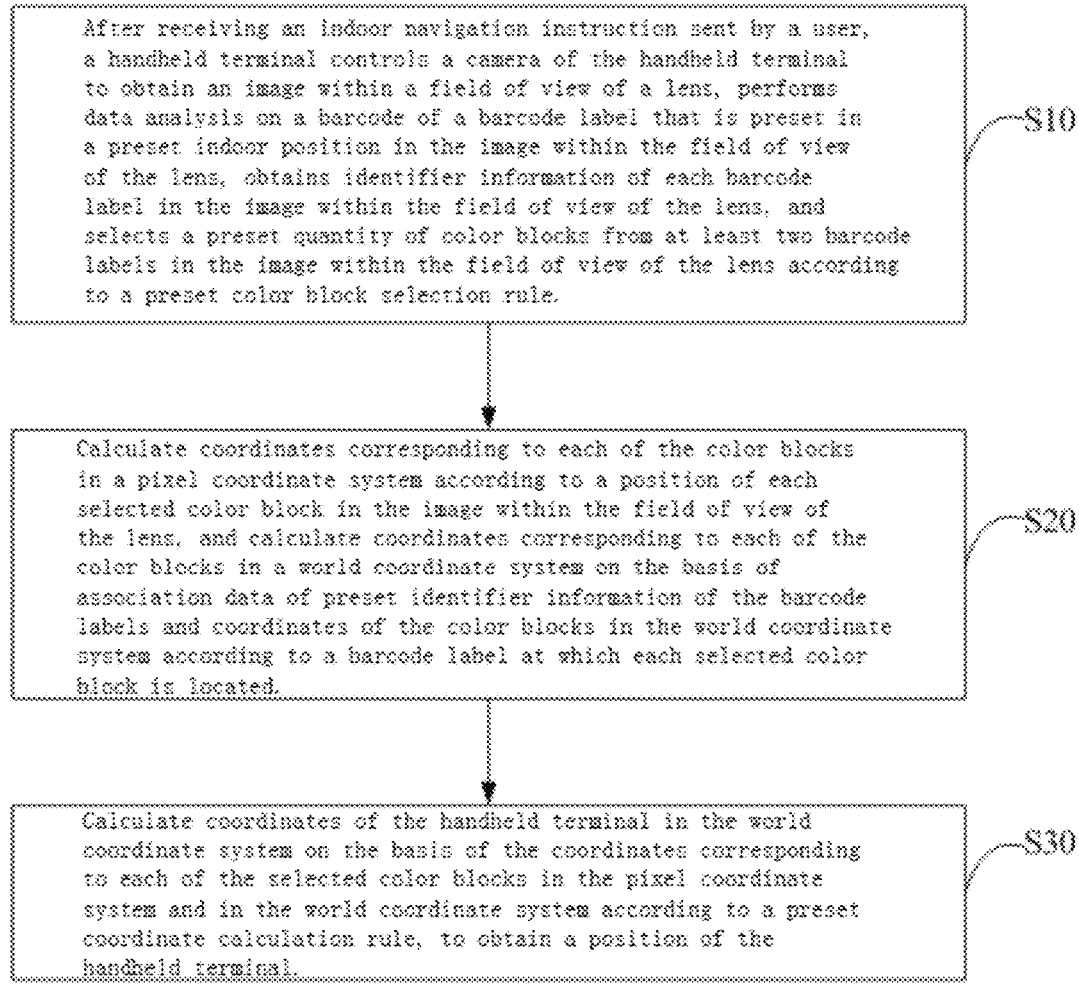
FIG. 2 is a schematic flowchart of a first embodiment of an indoor navigation method of a handheld terminal according to this application.

Referring to FIG. 2, FIG. 2 is a schematic flowchart of a first embodiment of an indoor navigation method of a handheld terminal according to the present invention.

In the first embodiment, the indoor navigation method of a handheld terminal includes:

Step S10. After receiving an indoor navigation instruction sent by a user, the handheld terminal controls a camera of the handheld terminal to obtain an image within a scope of a lens, performs data analysis on a barcode of a barcode label that is preset in a preset indoor position in the image within the scope of the lens, obtains identifier information of each barcode label in the image within the scope of the lens, and selects a preset quantity of color blocks from at least two barcode labels in the image within the scope of the lens according to a preset color block selection rule.

In this embodiment, the barcode label may be provided in advance in a preset position of an indoor place such as a floor, a wall, a ceiling. The barcode label includes at least corresponding identifier information, a color block, and the like. After receiving the indoor navigation instruction sent by the user through a physical key or a virtual key, the handheld terminal turns on the camera of the handheld terminal and controls the camera to obtain the image within the scope of the lens. The barcode label that is preset in a preset indoor position in the image within the scope of the lens is collected by the camera of the handheld terminal, and the handheld terminal performs data analysis on a barcode of the barcode label that is preset in a preset indoor position in the image within the scope of the lens, obtains identifier information of each barcode label in the image within the scope of the lens, and selects a preset quantity of color blocks from at least two barcode labels in the image within the scope of the lens according to a preset color block selection rule. The quantity of color blocks to be selected is not limited herein.

Step S20. Coordinates corresponding to each of the color blocks in a pixel coordinate system are calculated according to a position of each selected color block in the image within the scope of the lens, and coordinates corresponding to each of the color blocks in a world coordinate system are calculated on the basis of preset association data of identifier information of the barcode labels and coordinates of the color blocks in the world coordinate system according to a barcode label at which each selected color block is located.

For each selected color block, corresponding coordinates are determined in the pixel coordinate system according to the position of each selected color block in the image within the scope of the lens. For example, in one embodiment, coordinates of the geometric center of a color block are calculated in the pixel coordinate system. Corresponding coordinates are determined for each selected color block are determined in the world coordinate system on the basis of predetermined association data of the identifier information of the barcode labels and coordinates of the color blocks in the world coordinate system according to the barcode label at which each selected color block is located. For example, in one embodiment, coordinates of the geometric center of a color block are calculated in the world coordinate system.

Step S30. Coordinates of the handheld terminal in the world coordinate system are calculated on the basis of the coordinates corresponding to each of the selected color blocks in the pixel coordinate system and in the world coordinate system according to a preset coordinate calculation rule, to obtain a position of the handheld terminal.

The coordinates of the handheld terminal in the world coordinate system, that is, the position of the handheld terminal, are calculated on the basis of the coordinates corresponding to each of the selected color blocks in the pixel coordinate system and in the world coordinate system according to the preset coordinate calculation rule, so that calculation of a precise real-time position of the handheld terminal is implemented for indoor navigation.

In this embodiment, identifier information of the barcode label that is preset in a preset indoor position in the image within the scope of the lens is obtained by using the camera of the handheld terminal, a preset quantity of color blocks is selected from at least two barcode labels in the image within the scope of the lens, coordinates corresponding to each of the color blocks in a pixel coordinate system and in a world coordinate system are calculated, and a position of the handheld terminal is obtained through calculation on the basis of the coordinates corresponding to each of the selected color blocks in the pixel coordinate system and in the world coordinate system according to the preset coordinate calculation rule. Since indoor navigation can be performed by using only the camera of the handheld terminal and a barcode label preset in a preset indoor position, requirements on software and hardware are relatively low, and a precise real-time position of the handheld terminal can be quickly and accurately calculated according to synthetical calculation of the coordinates of the color blocks of the barcode label that is preset in the preset indoor position in the pixel coordinate system and in the world coordinate system, thereby improving indoor navigation precision.

Further, in another embodiment, the above barcode label includes a label matrix, a barcode, and two color blocks; the barcode and the two color blocks are provided on the label matrix, the two color blocks are located at two ends of the barcode, and the barcode is encoded with identifier information (for example, ID) of the barcode label to which the barcode belongs; and the preset quantity of the selected color blocks is four, and the preset color block selection rule is as follows: if there are only two barcode labels in the image within the scope of the lens, two color blocks are selected from the two barcode labels in the image within the scope of the lens, respectively; and if there are more than two barcode labels in the image within the scope of the lens, two barcode labels closest to the lens are targeted and two color blocks are selected from the two targeted barcode labels, respectively.

Further, in another embodiment, the above barcode label includes a label matrix, a barcode, and two color block combinations; the barcode and the two color block combinations are provided on the label matrix, and the two color block combinations are located at two ends of the barcode; the color block combination includes a plurality of color blocks with different colors, and the barcode is encoded with identifier information (for example, ID) of the barcode label to which the barcode belongs; and the preset quantity of the selected color blocks is four, and the preset color block selection rule is as follows: if there are only two barcode labels in the image within the scope of the lens, two color blocks located at the outermost end of the label matrix are selected from the two barcode labels in the image within the scope of the lens, respectively, that is, two outermost color blocks are selected from the two barcode labels in the image within the scope of the lens, respectively; if there are more than two barcode labels in the image within the scope of the lens, four color blocks having a maximum dispersion index are determined in each barcode label.

Figure 3:
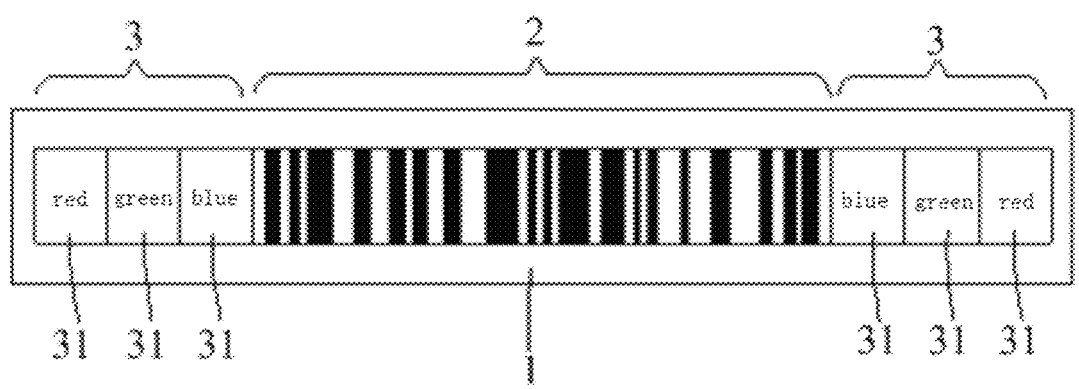
FIG. 3 is a schematic structural diagram of a barcode label in an embodiment of an indoor navigation method of a handheld terminal according to this application.

Specifically, as shown in FIG. 3, FIG. 3 is a schematic structural diagram of a barcode label in an embodiment of an indoor navigation method of a handheld terminal according to the present invention. The barcode label includes a label matrix 1, a barcode 2, and two color block combinations 3; the barcode 2 and the two color block combinations 3 are provided on the label matrix 1, and the two color block combinations 3 are located at two ends of the barcode 2; the color block combination 3 includes a plurality of color blocks 31 with different colors, such as the red, green, and blue color blocks 31 located at two ends of the barcode 2 in FIG. 2. The outermost color blocks are located at the outermost end of the label matrix 1, such as the red color blocks 31 in FIG. 3.

Further, in another embodiment, the step of determining four color blocks having a maximum dispersion index in each barcode label if there are more than two barcode labels in the image within the scope of the lens includes:

separately extracting four color blocks from different barcode labels in a manner of permutation and combination to form different color block combinations;

determining preset position points of four color blocks in each of the color block combinations, and if the determined four preset position points form a convex quadrilateral, using an area of the convex quadrilateral as a dispersion index of a corresponding color block combination; and if the determined four preset position points form a concave quadrilateral, determining three points forming a triangle with a largest area in the four points of the concave quadrilateral, and using an area of the triangle formed by the determined three points as a dispersion index of a corresponding color block combination; and comparing dispersion indexes corresponding to each color block combination, and determining four color blocks in a color block combination having the maximum dispersion index.

In this embodiment, four color blocks are separately extracted in a manner of permutation and combination from different barcode labels to form different color block combinations. For example, if there are N color blocks in total in all the barcode labels, color block combinations can be formed in total. For each of the color block combinations, preset position points, such as geometric center points, of the four color blocks in the color block combination are determined. If the determined four points form a convex quadrilateral, an area of the convex quadrilateral is used as a dispersion index of the corresponding color block combination; if the determined four points form a concave quadrilateral, three points forming a triangle with a largest area in the four points are determined, and an area of the triangle formed by the determined three points is used as a dispersion index of the corresponding color block combination; dispersion indexes corresponding to each color block combination are compared, so as to determine four color blocks in a color block combination having the maximum dispersion index.

In this embodiment, a quadrilateral is distinguished as a convex quadrilateral and a concave quadrilateral. A quadrilateral with any interior angle greater than 180 degrees is a concave quadrilateral, otherwise convex quadrilateral. For the convex quadrilateral, the area thereof is used as a measurement index of a degree of dispersion of the convex quadrilateral; for the concave quadrilateral, any three points are extracted to form a triangle, and a largest area of a triangle is used as a dispersion index of the concave quadrilateral.

Further, in another embodiment, the step of determining four color blocks having a maximum dispersion index in each barcode label if there are more than two barcode labels in the image within the scope of the lens further includes:

if the determined four preset position points form a convex quadrilateral, separately extracting three points from the four points of the convex quadrilateral in a manner of permutation and combination to form different triangle vertex combinations, separately calculating an area of a triangle corresponding to each of the triangle vertex combinations, dividing a sum of areas of triangles corresponding to all of the triangle vertex combinations by two to obtain an area of the convex quadrilateral, and using the area of the convex quadrilateral as a dispersion index of a corresponding color block combination.

In this embodiment, three points are separately extracted in a manner of permutation and combination from the four points of the convex quadrilateral to form different triangle vertex combinations. An area of a triangle corresponding to each of the triangle vertex combinations is separately calculated, and a sum of areas of triangles corresponding to all of the triangle vertex combinations is divided by two to obtain an area of the convex quadrilateral.

Figure 4:
FIG. 4 is a schematic diagram of four triangle vertex combinations formed by four points of a convex quadrilateral in an embodiment of an indoor navigation method of a handheld terminal according to this application.

Specifically, as shown in FIG. 4, FIG. 4 is a schematic diagram of four triangle vertex combinations formed by four points of a convex quadrilateral in an embodiment of an indoor navigation method of a handheld terminal according to the present invention. The convex quadrilateral has four vertexes in total, and $c_4^3$ triangle vertex combinations can be formed in total.

Further, in another embodiment, the step of determining four color blocks having a maximum dispersion index in each barcode label if there are more than two barcode labels in the image within the scope of the lens further includes:

if the determined four preset position points form a concave quadrilateral, separately extracting three points from the four points of the concave quadrilateral in a manner of permutation and combination to form different triangle vertex combinations, separately calculating an area of a triangle corresponding to each of the triangle vertex combinations, determining a triangle vertex combination corresponding to a triangle with a largest area, and using the largest area of the triangle as a dispersion index of a color block combination corresponding to the concave quadrilateral.

In this embodiment, three points are separately extracted in a manner of permutation and combination from the four points of the concave quadrilateral to form different triangle vertex combinations. An area of a triangle corresponding to each of the triangle vertex combinations is separately calculated, a triangle vertex combination corresponding to a triangle with a largest area is determined, and the largest area of the triangle is used as a dispersion index of the concave quadrilateral.

Figure 5:
FIG. 5 is a schematic diagram of four triangle vertex combinations formed by four points of a concave quadrilateral in an embodiment of an indoor navigation method of a handheld terminal according to this application.

Specifically, as shown in FIG. 5, FIG. 5 is a schematic diagram of four triangle vertex combinations formed by four points of a concave quadrilateral in an embodiment of an indoor navigation method of a handheld terminal according to the present invention. The concave quadrilateral has four vertexes in total, and $c_4^3$ triangle vertex combinations can be formed in total.

Further, in another embodiment, the step of separately calculating an area of a triangle corresponding to each of the triangle vertex combinations includes:

when an area of a triangle corresponding to a triangle vertex combination is calculated, traversing prestored association data of the triangle vertex combinations and areas of triangles, and analyzing whether there is a prestored triangle vertex combination matching the triangle vertex combination; for example, assuming that a prestored triangle vertex combination includes A1, A2, and A3 combinations, and the triangle vertex combination is formed by A1, A2, and A3 vertexes, so that it indicates that there is a prestored triangle vertex combination matching the triangle vertex combination.

if there is a prestored triangle vertex combination matching the triangle vertex combination, finding out an area of a triangle corresponding to the matched triangle vertex combination, and using the found area as an area of a triangle corresponding to the triangle vertex combination; and if there is no prestored triangle vertex combination matching the triangle vertex combination, determining, according to coordinates of each vertex of the triangle vertex combination in the world coordinate system, that is, coordinates corresponding to a color block at which each vertex of the triangle vertex combination is located in the world coordinate system, side lengths of all sides of a triangle corresponding to the triangle vertex combination, calculating an area of the triangle corresponding to the triangle vertex combination according to the determined side lengths, and associating the triangle vertex combination with the calculated area of the triangle to form association data and storing the association data for subsequent search for an area of a triangle.

Further, in another embodiment, the preset quantity of the selected color blocks is four, and the preset coordinate calculation rule is as follows:

a rotation matrix and a translation matrix belonging to camera extrinsic parameters are calculated on the basis of four coordinates corresponding to the selected four color blocks in the pixel coordinate system and four coordinates in the world coordinate system according to camera intrinsic parameters preset in the handheld terminal, and coordinates of the camera of the handheld terminal are acquired through transformation of the rotation matrix and the translation matrix and are used as the coordinates of the handheld terminal in the world coordinate system.

In this embodiment, a rotation matrix R and a translation matrix T belonging to camera extrinsic parameters are calculated on the basis of four coordinates corresponding to the selected four color blocks in the pixel coordinate system and in the world coordinate system according to camera intrinsic parameters ($f_x$, $f_y$, $u_0$, $v_0$). For example, a rotational vector Rvec and a translation matrix T are calculated by means of a solvePnP function in OpenCV, and a rotation matrix R is obtained by transforming the rotational vector Rveca by a cvRodrigues2 function in OpenCV; coordinates ($X_c=0$, $Y_c=0$, $Z_c=0$) of the origin of coordinates in a camera coordinate system are put in the following coordinate transformation formula:

$$\begin{bmatrix} X_c \\ Y_c \\ Z_c \end{bmatrix} = R \begin{bmatrix} X_{w1} \\ Y_{w1} \\ Z_{w1} \end{bmatrix} + T, R = \begin{bmatrix} R_{11} & R_{12} & R_{13} \\ R_{21} & R_{22} & R_{23} \\ R_{31} & R_{32} & R_{33} \end{bmatrix}, T = \begin{bmatrix} T_1 \\ T_2 \\ T_3 \end{bmatrix},$$

c refers to the camera coordinate system, w refers to the world coordinate system; and then coordinates of the camera in the world coordinate system is obtained, that is, the coordinates of the handheld terminal in the world coordinate system is:

$$\begin{bmatrix} X_{w1} \\ Y_{w1} \\ Z_{w1} \end{bmatrix} = -T \cdot R^{-1}.$$

Figure 6:
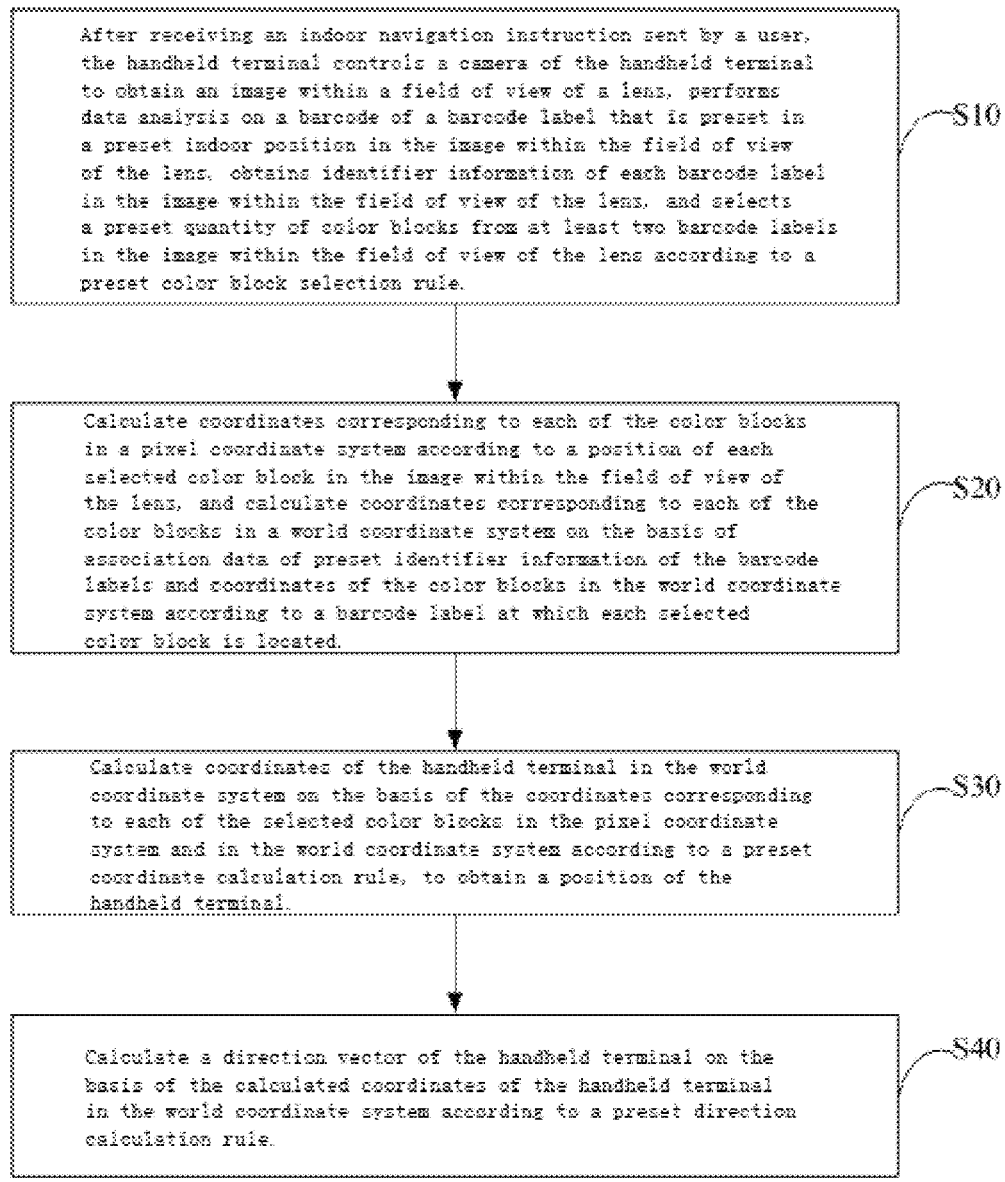
FIG. 6 is a schematic flowchart of a second embodiment of an indoor navigation method of a handheld terminal according to this application.

As shown in FIG. 6, a second embodiment of this application provides an indoor navigation method of a handheld terminal. Based on the foregoing embodiment, after the above step S30, the method further includes:

S40. Calculating a direction vector of the handheld terminal on the basis of the calculated coordinates of the handheld terminal in the world coordinate system according to a preset direction calculation rule.

In this embodiment, after the coordinates of the handheld terminal in the world coordinate system are calculated, the direction vector of the handheld terminal is calculated according to a preset direction calculation rule.

Specifically, the preset direction calculation rule is as follows: coordinates of a point of intersection of the direction vector and the ground in the world coordinate system are set to be ($X_{w2}$, $Y_{w2}$, $Z_{w2}$), where $Z_{w2}=0$, only $X_{w2}$, $Y_{w2}$ should be obtained. According to the coordinates ($X_{w1}$, $Y_{w1}$, $Z_{w1}$) of the handheld terminal in the world coordinate system, the camera intrinsic parameters ($f_x$, $f_y$, $u_0$, $v_0$), the rotation matrix R, and the translation matrix T, it can be obtained by a camera calibration model that:

$$Z_c \begin{bmatrix} u_0 \\ v_0 \\ 1 \end{bmatrix} = \begin{bmatrix} f_x & 0 & u_0 \\ 0 & f_y & v_0 \\ 0 & 0 & 1 \end{bmatrix} \begin{bmatrix} R_{11} & R_{12} & R_{13} & T_1 \\ R_{21} & R_{22} & R_{23} & T_2 \\ R_{31} & R_{32} & R_{33} & T_3 \end{bmatrix} \begin{bmatrix} X_{w2} \\ Y_{w2} \\ Z_{w2} \\ 1 \end{bmatrix} (Z_{w2}=0) \quad (3)$$

To make the expression concise, a matrix S is used for representation, and set $$S = \begin{bmatrix} S_{11} & S_{12} & S_{13} & S_{14} \\ S_{21} & S_{22} & S_{23} & S_{24} \\ S_{31} & S_{32} & S_{33} & S_{34} \end{bmatrix} = \begin{bmatrix} f_x & 0 & u_0 \\ 0 & f_y & v_0 \\ 0 & 0 & 1 \end{bmatrix} \begin{bmatrix} R_{11} & R_{12} & R_{13} & T_1 \\ R_{21} & R_{22} & R_{23} & T_2 \\ R_{31} & R_{32} & R_{33} & T_3 \end{bmatrix} \quad (4)$$

It can be obtained that $$uZ_c = S_{11}X_{w2} + S_{12}Y_{w2} + S_{14} \quad (5)$$

$$vZ_c = S_{21}X_{w2} + S_{22}Y_{w2} + S_{24} \quad (6)$$

$$Z_c = S_{31}X_{w2} + S_{32}Y_{w2} + S_{34} \quad (7)$$

It can be obtained by solving a simultaneous ternary linear equation of (5) (6) (7) that:

$$X_{w2} = \frac{S_{12}S_{24} - S_{14}S_{22} + u_0 S_{22}S_{34} - u_0 S_{24}S_{32} - v_0 S_{12}S_{34} + v_0 S_{14}S_{32}}{S_{11}S_{22} - S_{12}S_{21} + u_0 S_{12}S_{32} - u_0 S_{22}S_{31} - v_0 S_{11}S_{32} + v_0 S_{12}S_{31}} \quad (8)$$

$$Y_{w2} = \frac{S_{11}S_{24} - S_{14}S_{21} + uS_{21}S_{34} - uS_{24}S_{32} - v_0 S_{11}S_{34} + v_0 S_{24}S_{31}}{S_{11}S_{22} - S_{12}S_{21} + uS_{22}S_{32} - uS_{22}S_{31} - v_0 S_{11}S_{32} + v_0 S_{22}S_{31}} \quad (9)$$

$$Z_c = \frac{S_{11}S_{22}S_{34} - S_{11}S_{24}S_{32} - S_{12}S_{21}S_{34} + S_{12}S_{24}S_{31} + S_{14}S_{23}S_{32} + S_{14}S_{22}S_{31}}{S_{11}S_{22} - S_{12}S_{21} + u_0 S_{12}S_{32} - u_0 S_{22}S_{31} - v_0 S_{11}S_{32} + v_0 S_{12}S_{31}} \quad (10)$$

$Z_{w2}=0$ is already known, and coordinates ($X_{w2}$, $Y_{w2}$, $Z_{w2}$) of a point of intersection of a normal vector and the ground in the world coordinate system has an analytical solution, so that the direction vector of the handheld terminal is ($X_{w2}-X_{w1}$, $Y_{w2}-Y_{w1}$, $Z_{w2}-Z_{w1}$).

Figure 7:
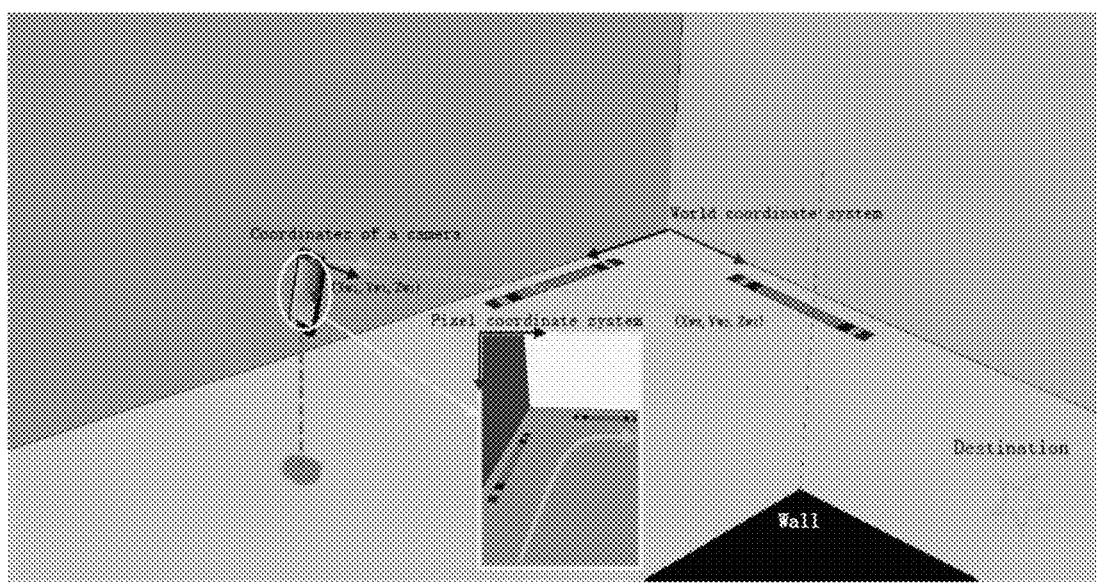
FIG. 7 is a schematic diagram of navigation application in an embodiment of an indoor navigation method of a handheld terminal according to this application.

Further, as shown in FIG. 7, FIG. 7 is a schematic diagram of navigation application in an embodiment of an indoor navigation method of a handheld terminal according to the present invention.

In this embodiment, identifier information of the barcode label that is preset in a preset indoor position in the image within the scope of the lens is obtained by using the camera of the handheld terminal, a preset quantity of color blocks is selected from at least two barcode labels in the image within the scope of the lens, coordinates corresponding to each of the color blocks in a pixel coordinate system and in a world coordinate system are calculated, and a position and a direction vector of the handheld terminal is obtained through calculation on the basis of the coordinates corresponding to each of the selected color blocks in the pixel coordinate system and in the world coordinate system according to the preset coordinate calculation rule. Since a precise real-time position and a direction vector of the handheld terminal can be quickly and accurately calculated according to synthetical calculation of the coordinates of the color blocks of the barcode label that is preset in the preset indoor position in the pixel coordinate system and in the world coordinate system, thereby improving indoor navigation precision.

The present invention further provides a handheld terminal for indoor navigation.

Figure 8:
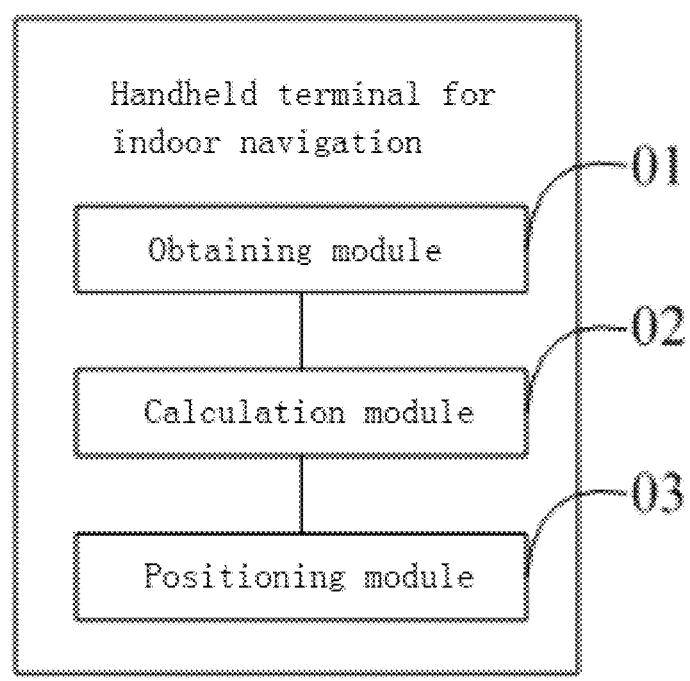
FIG. 8 is a schematic diagram of a functional module of a first embodiment of a handheld terminal for indoor navigation according to this application.

Referring to FIG. 8, FIG. 8 is a schematic diagram of a functional module of a first embodiment of a handheld terminal for indoor navigation according to the present invention.

In the first embodiment, the handheld terminal for indoor navigation includes:

an obtaining module 01, configured to control, when an indoor navigation instruction sent by a user is received, a camera of the handheld terminal to obtain an image within a scope of a lens, perform data analysis on a barcode of a barcode label that is preset in a preset indoor position in the image within the scope of the lens, obtain identifier information of each barcode label in the image within the scope of the lens, and select a preset quantity of color blocks from at least two barcode labels in the image within the scope of the lens according to a preset color block selection rule;

In this embodiment, the barcode label may be provided in advance in a preset position of an indoor place such as a floor, a wall, a ceiling. The barcode label includes at least corresponding identifier information, a color block, and the like. After receiving the indoor navigation instruction sent by the user through a physical key or a virtual key, the handheld terminal turns on the camera of the handheld terminal and controls the camera to obtain the image within the scope of the lens. The barcode label that is preset in a preset indoor position in the image within the scope of the lens is collected by the camera of the handheld terminal, and the handheld terminal performs data analysis on a barcode of the barcode label that is preset in a preset indoor position in the image within the scope of the lens, obtains identifier information of each barcode label in the image within the scope of the lens, and selects a preset quantity of color blocks from at least two barcode labels in the image within the scope of the lens according to a preset color block selection rule. The quantity of color blocks to be selected is not limited herein.

a calculation module 02, configured to calculate coordinates corresponding to each of the color blocks in a pixel coordinate system according to a position of each selected color block in the image within the scope of the lens, and calculate coordinates corresponding to each of the color blocks in a world coordinate system on the basis of preset association data of identifier information of the barcode labels and coordinates of the color blocks in the world coordinate system according to a barcode label at which each selected color block is located;

For each selected color block, corresponding coordinates are determined in the pixel coordinate system according to the position of each selected color block in the image within the scope of the lens. For example, in one embodiment, coordinates of the geometric center of a color block are calculated in the pixel coordinate system. Corresponding coordinates are determined for each selected color block are determined in the world coordinate system on the basis of predetermined association data of the identifier information of the barcode labels and coordinates of the color blocks in the world coordinate system according to the barcode label at which each selected color block is located. For example, in one embodiment, coordinates of the geometric center of a color block are calculated in the world coordinate system.

a positioning module 03, configured to calculate coordinates of the handheld terminal in the world coordinate system on the basis of the coordinates corresponding to each of the selected color blocks in the pixel coordinate system and in the world coordinate system according to a preset coordinate calculation rule, to obtain a position of the handheld terminal.

The coordinates of the handheld terminal in the world coordinate system, that is, the position of the handheld terminal, are calculated on the basis of the coordinates corresponding to each of the selected color blocks in the pixel coordinate system and in the world coordinate system according to the preset coordinate calculation rule, so that calculation of a precise real-time position of the handheld terminal is implemented for indoor navigation.

In this embodiment, identifier information of the barcode label that is preset in a preset indoor position in the image within the scope of the lens is obtained by using the camera of the handheld terminal, a preset quantity of color blocks is selected from at least two barcode labels in the image within the scope of the lens, coordinates corresponding to each of the color blocks in a pixel coordinate system and in a world coordinate system are calculated, and a position of the handheld terminal is obtained through calculation on the basis of the coordinates corresponding to each of the selected color blocks in the pixel coordinate system and in the world coordinate system according to the preset coordinate calculation rule. Since indoor navigation can be performed by using only the camera of the handheld terminal and a barcode label preset in a preset indoor position, requirements on software and hardware are relatively low, and a precise real-time position of the handheld terminal can be quickly and accurately calculated according to synthetical calculation of the coordinates of the color blocks of the barcode label that is preset in the preset indoor position in the pixel coordinate system and in the world coordinate system, thereby improving indoor navigation precision.

Further, in another embodiment, the above barcode label includes a label matrix, a barcode, and two color blocks; the barcode and the two color blocks are provided on the label matrix, the two color blocks are located at two ends of the barcode, and the barcode is encoded with identifier information (for example, ID) of the barcode label to which the barcode belongs; and the preset quantity of the selected color blocks is four, and the preset color block selection rule is as follows: if there are only two barcode labels in the image within the scope of the lens, two color blocks are selected from the two barcode labels in the image within the scope of the lens, respectively; and if there are more than two barcode labels in the image within the scope of the lens, two barcode labels closest to the lens are targeted and two color blocks are selected from the two targeted barcode labels, respectively.

Further, in another embodiment, the above barcode label includes a label matrix, a barcode, and two color block combinations; the barcode and the two color block combinations are provided on the label matrix, and the two color block combinations are located at two ends of the barcode; the color block combination includes a plurality of color blocks with different colors, and the barcode is encoded with identifier information (for example, ID) of the barcode label to which the barcode belongs; and the preset quantity of the selected color blocks is four, and the preset color block selection rule is as follows: if there are only two barcode labels in the image within the scope of the lens, two color blocks located at the outermost end of the label matrix are selected from the two barcode labels in the image within the scope of the lens, respectively, that is, two outermost color blocks are selected from the two barcode labels in the image within the scope of the lens, respectively; if there are more than two barcode labels in the image within the scope of the lens, four color blocks having a maximum dispersion index are determined in each barcode label.

Further, in another embodiment, the calculation module 02 is further configured to:

separately extract four color blocks from different barcode labels in a manner of permutation and combination to form different color block combinations; determine preset position points of four color blocks in each of the color block combinations, and if the determined four preset position points form a convex quadrilateral, use an area of the convex quadrilateral as a dispersion index of a corresponding color block combination; if the determined four preset position points form a concave quadrilateral, determine three points forming a triangle with a largest area in the four points of the concave quadrilateral, and use an area of the triangle formed by the determined three points as a dispersion index of a corresponding color block combination; compare dispersion indexes corresponding to each color block combination, and determine four color blocks in a color block combination having the maximum dispersion index.

In this embodiment, four color blocks are separately extracted in a manner of permutation and combination from different barcode labels to form different color block combinations. For example, if there are N color blocks in total in all the barcode labels, $C^4_N$ color block combinations can be formed in total. For each of the color block combinations, preset position points, such as geometric center points, of the four color blocks in the color block combination are determined. If the determined four points form a convex quadrilateral, an area of the convex quadrilateral is used as a dispersion index of the corresponding color block combination; if the determined four points form a concave quadrilateral, three points forming a triangle with a largest area in the four points are determined, and the area of the triangle formed by the determined three points is used as a dispersion index of the corresponding color block combination; dispersion indexes corresponding to each color block combination are compared, so as to determine four color blocks in a color block combination having the maximum dispersion index.

In this embodiment, a quadrilateral is distinguished as a convex quadrilateral and a concave quadrilateral. A quadrilateral with any interior angle greater than 180 degrees is a concave quadrilateral, otherwise convex quadrilateral. For the convex quadrilateral, the area thereof is used as a measurement index of a degree of dispersion of the convex quadrilateral; for the concave quadrilateral, any three points are extracted to form a triangle, and a largest area of a triangle is used as a dispersion index of the concave quadrilateral.

Further, in another embodiment, the calculation module 02 is further configured to:

if the determined four preset position points form a convex quadrilateral, separately extract three points from the four points of the convex quadrilateral in a manner of permutation and combination to form different triangle vertex combinations, separately calculate an area of a triangle corresponding to each of the triangle vertex combinations, divide a sum of areas of triangles corresponding to all of the triangle vertex combinations by two to obtain an area of the convex quadrilateral, and use the area of the convex quadrilateral as a dispersion index of a corresponding color block combination.

In this embodiment, three points are separately extracted in a manner of permutation and combination from the four points of the convex quadrilateral to form different triangle vertex combinations. An area of a triangle corresponding to each of the triangle vertex combinations is separately calculated, and a sum of areas of triangles corresponding to all of the triangle vertex combinations is divided by two to obtain an area of the convex quadrilateral.

Further, in another embodiment, the calculation module 02 is further configured to:

if the determined four preset position points form a concave quadrilateral, separately extract three points from the four points of the concave quadrilateral in a manner of permutation and combination to form different triangle vertex combinations, separately calculate an area of a triangle corresponding to each of the triangle vertex combinations, determine a triangle vertex combination corresponding to a triangle with a largest area, and use the largest area of the triangle as a dispersion index of a color block combination corresponding to the concave quadrilateral.

In this embodiment, three points are separately extracted in a manner of permutation and combination from the four points of the concave quadrilateral to form different triangle vertex combinations. An area of a triangle corresponding to each of the triangle vertex combinations is separately calculated, a triangle vertex combination corresponding to a triangle with a largest area is determined, and the largest area of the triangle is used as a dispersion index of the concave quadrilateral.

Further, in another embodiment, the calculation module 02 is further configured to:

when an area of a triangle corresponding to a triangle vertex combination is calculated, traverse prestored association data of the triangle vertex combinations and areas of triangles, and analyze whether there is a prestored triangle vertex combination matching the triangle vertex combination; for example, assuming that a prestored triangle vertex combination includes A1, A2, and A3 combinations, and the triangle vertex combination is formed by A1, A2, and A3 vertexes, so that it indicates that there is a prestored triangle vertex combination matching the triangle vertex combination.

if there is a prestored triangle vertex combination matching the triangle vertex combination, find out an area of a triangle corresponding to the matched triangle vertex combination, and use the found area as an area of a triangle corresponding to the triangle vertex combination; and if there is no prestored triangle vertex combination matching the triangle vertex combination, determine, according to coordinates of each vertex of the triangle vertex combination in the world coordinate system, that is, coordinates corresponding to a color block at which each vertex of the triangle vertex combination is located in the world coordinate system, side lengths of all sides of a triangle corresponding to the triangle vertex combination, calculate an area of the triangle corresponding to the triangle vertex combination according to the determined side lengths, and associate the triangle vertex combination with the calculated area of the triangle to form association data and store the association data for subsequent search for an area of a triangle.

Further, in another embodiment, the preset quantity of the selected color blocks is four, and the preset coordinate calculation rule is as follows:

a rotation matrix and a translation matrix belonging to camera extrinsic parameters are calculated on the basis of four coordinates corresponding to the selected four color blocks in the pixel coordinate system and four coordinates in the world coordinate system according to camera intrinsic parameters preset in the handheld terminal, and coordinates of the camera of the handheld terminal are acquired through transformation of the rotation matrix and the translation matrix and are used as the coordinates of the handheld terminal in the world coordinate system.

In this embodiment, a rotation matrix R and a translation matrix T belonging to camera extrinsic parameters are calculated on the basis of four coordinates corresponding to the selected four color blocks in the pixel coordinate system and in the world coordinate system according to camera intrinsic parameters ($f_x$, $f_y$, $u_0$, $v_0$). For example, a rotational vector Rvec and a translation matrix T are calculated by means of a solvePnP function in OpenCV, and a rotation matrix R is obtained by transforming the rotational vector Rveca by a cvRodrigues2 function in OpenCV; coordinates ($X_c=0$, $Y_c=0$, $Z_c=0$) of the origin of coordinates in a camera coordinate system are put in the following coordinate transformation formula:

$$\begin{bmatrix} X_c \\ Y_c \\ Z_c \end{bmatrix} = R \begin{bmatrix} X_{w1} \\ Y_{w1} \\ Z_{w1} \end{bmatrix} + T, R = \begin{bmatrix} R_{11} & R_{12} & R_{13} \\ R_{21} & R_{22} & R_{23} \\ R_{31} & R_{32} & R_{33} \end{bmatrix}, T = \begin{bmatrix} T_1 \\ T_2 \\ T_3 \end{bmatrix},$$

c refers to the camera coordinate system, w refers to the world coordinate system; and then coordinates of the camera in the world coordinate system is obtained, that is, the coordinates of the handheld terminal in the world coordinate system is:

$$\begin{bmatrix} X_{w1} \\ Y_{w1} \\ Z_{w1} \end{bmatrix} = -T \cdot R^{-1}.$$

Figure 9:
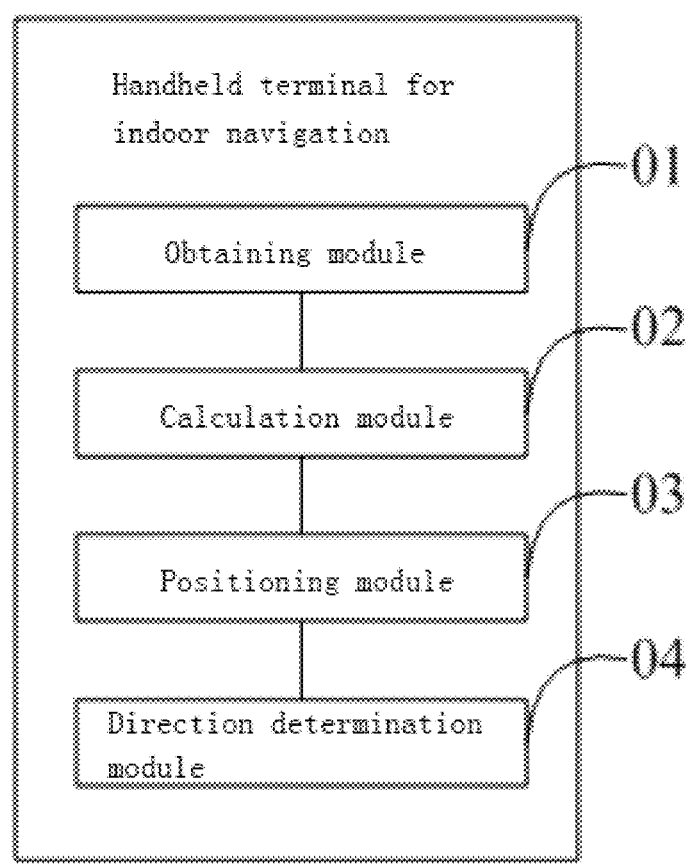
FIG. 9 is a schematic diagram of a functional module of a second embodiment of a handheld terminal for indoor navigation according to this application.

As shown in FIG. 9, a second embodiment of this application provides a handheld terminal for indoor navigation. Based on the foregoing embodiment, the handheld terminal further includes:

a direction determination module 04, configured to calculate a direction vector of the handheld terminal on the basis of the calculated coordinates of the handheld terminal in the world coordinate system according to a preset direction calculation rule.

In this embodiment, after the coordinates of the handheld terminal in the world coordinate system are calculated, the direction vector of the handheld terminal is calculated according to a preset direction calculation rule.

Specifically, the preset direction calculation rule is as follows: coordinates of a point of intersection of the direction vector and the ground in the world coordinate system are set to be $X_{w2}$, $Y_{w2}$, $Z_{w2}$), where $Z_{w2}=0$, only $X_{w2}$, $Y_{w2}$ should be obtained. According to the coordinates ($X_{w1}$, $Y_{w1}$, $Z_{w1}$) of the handheld terminal in the world coordinate system, the camera intrinsic parameters ($f_x$, $f_y$, $u_0$, $v_0$), the rotation matrix R, and the translation matrix T, it can be obtained by a camera calibration model that:

$$Z_c \begin{bmatrix} u_0 \\ v_0 \\ 1 \end{bmatrix} = \begin{bmatrix} f_x & 0 & u_0 \\ 0 & f_y & v_0 \\ 0 & 0 & 1 \end{bmatrix} \begin{bmatrix} R_{11} & R_{12} & R_{13} & T_1 \\ R_{21} & R_{22} & R_{23} & T_2 \\ R_{31} & R_{32} & R_{33} & T_3 \end{bmatrix} \begin{bmatrix} X_{w2} \\ Y_{w2} \\ Z_{w2} \\ 1 \end{bmatrix} (Z_{w2}=0) \quad (3)$$

To make the expression concise, a matrix S is used for representation, and set $$S = \begin{bmatrix} S_{11} & S_{12} & S_{13} & S_{14} \\ S_{21} & S_{22} & S_{23} & S_{24} \\ S_{31} & S_{32} & S_{33} & S_{34} \end{bmatrix} = \begin{bmatrix} f_x & 0 & u_0 \\ 0 & f_y & v_0 \\ 0 & 0 & 1 \end{bmatrix} \begin{bmatrix} R_{11} & R_{12} & R_{13} & T_1 \\ R_{21} & R_{22} & R_{23} & T_2 \\ R_{31} & R_{32} & R_{33} & T_3 \end{bmatrix} \quad (4)$$

It can be obtained that $$uZ_c = S_{11}X_{w2} + S_{12}Y_{w2} + S_{14} \quad (5)$$

$$vZ_c = S_{21}X_{w2} + S_{22}Y_{w2} + S_{24} \quad (6)$$

$$Z_c = S_{31}X_{w2} + S_{32}Y_{w2} + S_{34} \quad (7)$$

It can be obtained by solving a simultaneous ternary linear equation of (5) (6) (7) that:

$$X_{w2} = \frac{S_{12}S_{24} - S_{14}S_{22} + u_0S_{22}S_{34} - u_0S_{24}S_{32} - v_0S_{12}S_{34} + v_0S_{14}S_{32}}{S_{11}S_{22} - S_{12}S_{21} + u_0S_{12}S_{32} - u_0S_{22}S_{31} - v_0S_{11}S_{32} + v_0S_{12}S_{31}} \quad (8)$$

$$Y_{w2} = \frac{S_{11}S_{24} - S_{14}S_{21} + uS_{21}S_{34} - uS_{24}S_{32} - v_0S_{11}S_{34} + v_0S_{24}S_{31}}{S_{11}S_{22} - S_{12}S_{21} + uS_{22}S_{32} - uS_{22}S_{31} - v_0S_{11}S_{32} + v_0S_{22}S_{31}} \quad (9)$$

$$Z_c = \frac{S_{11}S_{22}S_{34} - S_{11}S_{24}S_{32} - S_{12}S_{21}S_{34} + S_{12}S_{24}S_{31} + S_{14}S_{23}S_{32} + S_{14}S_{22}S_{31}}{S_{11}S_{22} - S_{12}S_{21} + u_0S_{12}S_{32} - u_0S_{22}S_{31} - v_0S_{11}S_{32} + v_0S_{12}S_{31}} \quad (10)$$

$Z_{w2}=0$ is already known, and coordinates ($X_{w2}$, $Y_{w2}$, $Z_{w2}$) of a point of intersection of a normal vector and the ground in the world coordinate system has an analytical solution, so that the direction vector of the handheld terminal is ($X_{w2}-X_{w1}$, $Y_{w2}-Y_{w1}$, $Z_{w2}-Z_{w1}$).

The sequence numbers of the foregoing embodiments of the present invention are merely for the purpose of description and do not represent advantages and disadvantages of the embodiments. By means of the above description of the embodiments, those skilled in the art can clearly understand that the above method in the embodiments may be implemented by means of software and a necessary general-purpose hardware platform. Certainly, the hardware may be used, but the former is a better implementation manner in many cases. Based on this understanding, the technical solution of the present invention essentially, or a part contributing to the prior art, may be embodied in a form of a software product. The computer software product is stored on a storage medium (such as a ROM/RAM, a magnetic disk, an optical disk), and includes several instructions to enable terminal equipment (may be a mobile phone, a computer, a server, or network equipment) to execute the method according to each embodiment of the present invention.

The foregoing is merely a favorable embodiment of this application and does not constitute a limitation on the scope of the present invention. Any equivalent structure or equivalent process change made by using the description and the accompanying drawings of the present invention, or direct or indirect application thereof in other related technical fields, shall still fall in the protection scope of the patent of the present invention.

What is claimed is:

1. An indoor navigation method of a handheld terminal, the method comprising:
    after receiving an indoor navigation instruction sent by a user, controlling, by the handheld terminal, a camera of the handheld terminal to obtain an image within a scope of a lens, performing data analysis on one or more barcodes of barcode labels, wherein the barcode labels are preset in a preset indoor position in the image within the scope of the lens, obtaining identifier information of each barcode label in the image within the scope of the lens, and selecting a preset quantity of color blocks from at least two barcode labels in the image within the scope of the lens according to a preset color block selection rule;
    calculating coordinates corresponding to each of the color blocks in a pixel coordinate system according to a position of each selected color block in the image within the scope of the lens, and calculating coordinates corresponding to each of the color blocks in a world coordinate system on the basis of preset association data of identifier information of the barcode labels and coordinates of the color blocks in the world coordinate system according to a barcode label at which each selected color block is located; and
    calculating coordinates of the handheld terminal in the world coordinate system on the basis of the coordinates corresponding to each of the selected color blocks in the pixel coordinate system and in the world coordinate system according to a preset coordinate calculation rule, to obtain a position of the handheld terminal.

2. The indoor navigation method of a handheld terminal of claim 1, wherein the barcode label comprises a label matrix, a barcode, and two color blocks; the barcode and the two color blocks are provided on the label matrix, the two color blocks are located at two ends of the barcode, and the barcode is encoded with the identifier information of the barcode label to which the barcode belongs; and the preset quantity of the selected color blocks is four, and the preset color block selection rule is as follows: if there are only two barcode labels in the image within the scope of the lens, two color blocks are selected from the two barcode labels in the image within the scope of the lens, respectively; and if there are more than two barcode labels in the image within the scope of the lens, two barcode labels closest to the lens are targeted and two color blocks are selected from the two targeted barcode labels, respectively.

3. The indoor navigation method of a handheld terminal of claim 1, wherein each of the barcode labels comprises a label matrix, a barcode, and two color block combinations; the barcode and the two color block combinations are provided on the label matrix, and the two color block combinations are located at two ends of the barcode; the color block combination comprises a plurality of color blocks with different colors, and the barcode is encoded with the identifier information of the barcode label to which the barcode belongs; and the preset quantity of the selected color blocks is four, and the preset color block selection rule is as follows: if there are only two barcode labels in the image within the scope of the lens, two color blocks located at the outermost end of the label matrix are selected from the two barcode labels in the image within the scope of the lens, respectively; and if there are more than two barcode labels in the image within the scope of the lens, four color blocks having a maximum dispersion index are determined from the barcode labels.

4. The indoor navigation method of a handheld terminal of claim 3, wherein the step of determining four color blocks having a maximum dispersion index from the barcode labels if there are more than two barcode labels in the image within the scope of the lens comprises:
    separately extracting four color blocks from different barcode labels in a manner of permutation and combination to form different color block combinations;
    determining preset position points of four color blocks in each of the color block combinations, and if the determined four preset position points form a convex quadrilateral, using an area of the convex quadrilateral as a dispersion index of a corresponding color block combination; and if the determined four preset position points form a concave quadrilateral, determining three points forming a triangle with a largest area in the four points of the concave quadrilateral, and using an area of the triangle formed by the determined three points as a dispersion index of a corresponding color block combination; and
    comparing dispersion indexes corresponding to each color block combination, and determining four color blocks in a color block combination having the maximum dispersion index.

5. The indoor navigation method of a handheld terminal of claim 4, wherein the step of determining four color blocks having a maximum dispersion index from the barcode labels if there are more than two barcode labels in the image within the scope of the lens further comprises:
    if the determined four preset position points form a convex quadrilateral, separately extracting three points from the four points of the convex quadrilateral in a manner of permutation and combination to form different triangle vertex combinations, separately calculating an area of a triangle corresponding to each of the triangle vertex combinations, dividing a sum of areas of triangles corresponding to all of the triangle vertex combinations by two to obtain an area of the convex quadrilateral, and using the area of the convex quadrilateral as a dispersion index of a corresponding color block combination.

6. The indoor navigation method of a handheld terminal of claim 5, wherein the step of separately calculating an area of a triangle corresponding to each of the triangle vertex combinations comprises: when an area of a triangle corresponding to a triangle vertex combination is calculated, traversing prestored association data of the triangle vertex combinations and areas of triangles, and analyzing whether there is a prestored triangle vertex combination matching the triangle vertex combination; if there is a prestored triangle vertex combination matching the triangle vertex combination, finding out an area of a triangle corresponding to the matched triangle vertex combination, and using the found area as an area of a triangle corresponding to the triangle vertex combination; and if there is no prestored triangle vertex combination matching the triangle vertex combination, determining side lengths of all sides of a triangle corresponding to the triangle vertex combination according to coordinates of each vertex of the triangle vertex combination in the world coordinate system, calculating an area of the triangle corresponding to the triangle vertex combination according to the determined side lengths, and associating the triangle vertex combination with the calculated area of the triangle to form association data and storing the association data for subsequent search for the area of the triangle.

7. The indoor navigation method of a handheld terminal of claim 1, wherein the preset quantity of the selected color blocks is four, and the preset coordinate calculation rule is as follows:

a rotation matrix and a translation matrix belonging to camera extrinsic parameters are calculated on the basis of four coordinates corresponding to the selected four color blocks in the pixel coordinate system and four coordinates in the world coordinate system according to camera intrinsic parameters preset in the handheld terminal, and coordinates of the camera of the handheld terminal in the world coordinate system are acquired through transformation of the rotation matrix and the translation matrix and are used as the coordinates of the handheld terminal in the world coordinate system.

8. The indoor navigation method of a handheld terminal of claim 7, wherein after the step of calculating coordinates of the handheld terminal in the world coordinate system on the basis of the coordinates corresponding to each of the selected color blocks in the pixel coordinate system and in the world coordinate system according to a preset coordinate calculation rule, to obtain a position of the handheld terminal, the method further comprises:

calculating a direction vector of the handheld terminal on the basis of the calculated coordinates of the handheld terminal in the world coordinate system according to a preset direction calculation rule.

9. The indoor navigation method of a handheld terminal of claim 8, wherein the preset direction calculation rule is as follows:

the direction vector of the handheld terminal is obtained through calculation by a preset camera calibration model according to the coordinates of the handheld terminal in the world coordinate system, the camera intrinsic parameters, the rotation matrix, and the translation matrix.

10. A handheld terminal, comprising user interaction equipment, storage equipment, a camera, and a processor, wherein the user interaction equipment is configured to implement interaction between the terminal and a user, the storage equipment stores a computer-readable code instruction, and the computer-readable code instruction is executed by the processor to implement the steps of:

after receiving an indoor navigation instruction sent by a user, controlling a camera of the handheld terminal to obtain an image within a scope of a lens, performing data analysis on one or more barcodes of barcode labels, wherein the barcode labels are preset in a preset indoor position in the image within the scope of the lens, obtaining identifier information of each barcode label in the image within the scope of the lens, and selecting a preset quantity of color blocks from at least two barcode labels in the image within the scope of the lens according to a preset color block selection rule;

calculating coordinates corresponding to each of the color blocks in a pixel coordinate system according to a position of each selected color block in the image within the scope of the lens, and calculating coordinates corresponding to each of the color blocks in a world coordinate system on the basis of preset association data of identifier information of the barcode labels and coordinates of the color blocks in the world coordinate system according to a barcode label at which each selected color block is located; and calculating coordinates of the handheld terminal in the world coordinate system on the basis of the coordinates corresponding to each of the selected color blocks in the pixel coordinate system and in the world coordinate system according to a preset coordinate calculation rule, to obtain a position of the handheld terminal.

11. The handheld terminal of claim 10, wherein the barcode label comprises a label matrix, a barcode, and two color blocks; the barcode and the two color blocks are provided on the label matrix, the two color blocks are located at two ends of the barcode, and the barcode is encoded with the identifier information of the barcode label to which the barcode belongs; and the preset quantity of the selected color blocks is four, and the preset color block selection rule is as follows: if there are only two barcode labels in the image within the scope of the lens, two color blocks are selected from the two barcode labels in the image within the scope of the lens, respectively; and if there are more than two barcode labels in the image within the scope of the lens, two barcode labels closest to the lens are targeted and two color blocks are selected from the two targeted barcode labels, respectively.

12. The handheld terminal of claim 10, wherein each of the barcode labels comprises a label matrix, a barcode, and two color block combinations; the barcode and the two color block combinations are provided on the label matrix, and the two color block combinations are located at two ends of the barcode; the color block combination comprises a plurality of color blocks with different colors, and the barcode is encoded with the identifier information of the barcode label to which the barcode belongs; and the preset quantity of the selected color blocks is four, and the preset color block selection rule is as follows: if there are only two barcode labels in the image within the scope of the lens, two color blocks located at the outermost end of the label matrix are selected from the two barcode labels in the image within the scope of the lens, respectively; and if there are more than two barcode labels in the image within the scope of the lens, four color blocks having a maximum dispersion index are determined from the barcode labels.

13. The handheld terminal of claim 12, wherein the step of determining four color blocks having a maximum dispersion index from the barcode labels if there are more than two barcode labels in the image within the scope of the lens comprises:

separately extracting four color blocks from different barcode labels in a manner of permutation and combination to form different color block combinations;

determining preset position points of four color blocks in each of the color block combinations, and if the determined four preset position points form a convex quadrilateral, using an area of the convex quadrilateral as a dispersion index of a corresponding color block combination; and if the determined four preset position points form a concave quadrilateral, determining three points forming a triangle with a largest area in the four points of the concave quadrilateral, and using an area of the triangle formed by the determined three points as a dispersion index of a corresponding color block combination; and comparing dispersion indexes corresponding to each color block combination, and determining four color blocks in a color block combination having the maximum dispersion index.

14. The handheld terminal of claim 13, wherein the step of determining four color blocks having a maximum dispersion index from the barcode labels if there are more than two barcode labels in the image within the scope of the lens further comprises:

if the determined four preset position points form a convex quadrilateral, separately extracting three points from the four points of the convex quadrilateral in a manner of permutation and combination to form different triangle vertex combinations, separately calculating an area of a triangle corresponding to each of the triangle vertex combinations, dividing a sum of areas of triangles corresponding to all of the triangle vertex combinations by two to obtain an area of the convex quadrilateral, and using the area of the convex quadrilateral as a dispersion index of a corresponding color block combination.

15. The handheld terminal of claim 13, wherein the step of determining four color blocks having a maximum dispersion index from the barcode labels if there are more than two barcode labels in the image within the scope of the lens further comprises:

if the determined four preset position points form a concave quadrilateral, separately extracting three points from the four points of the concave quadrilateral in a manner of permutation and combination to form different triangle vertex combinations, separately calculating an area of a triangle corresponding to each of the triangle vertex combinations, determining a triangle vertex combination corresponding to a triangle with a largest area, and using the largest area of the triangle as a dispersion index of a color block combination corresponding to the concave quadrilateral.

16. The handheld terminal of claim 15, wherein the step of separately calculating an area of a triangle corresponding to each of the triangle vertex combinations comprises:

when an area of a triangle corresponding to a triangle vertex combination is calculated, traversing prestored association data of the triangle vertex combinations and areas of triangles, and analyzing whether there is a prestored triangle vertex combination matching the triangle vertex combination;

if there is a prestored triangle vertex combination matching the triangle vertex combination, finding out an area of a triangle corresponding to the matched triangle vertex combination, and using the found area as an area of a triangle corresponding to the triangle vertex combination; and if there is no prestored triangle vertex combination matching the triangle vertex combination, determining side lengths of all sides of a triangle corresponding to the triangle vertex combination according to coordinates of each vertex of the triangle vertex combination in the world coordinate system, calculating an area of the triangle corresponding to the triangle vertex combination according to the determined side lengths, and associating the triangle vertex combination with the calculated area of the triangle to form association data and storing the association data for subsequent search for the area of the triangle.

17. The handheld terminal of claim 10, wherein the preset quantity of the selected color blocks is four, and the preset coordinate calculation rule is as follows:

a rotation matrix and a translation matrix belonging to camera extrinsic parameters are calculated on the basis of four coordinates corresponding to the selected four color blocks in the pixel coordinate system and four coordinates in the world coordinate system according to camera intrinsic parameters preset in the handheld terminal, and coordinates of the camera of the handheld terminal in the world coordinate system are acquired through transformation of the rotation matrix and the translation matrix and are used as the coordinates of the handheld terminal in the world coordinate system.

18. The handheld terminal of claim 17, wherein after the step of calculating coordinates of the handheld terminal in the world coordinate system on the basis of the coordinates corresponding to each of the selected color blocks in the pixel coordinate system and in the world coordinate system according to a preset coordinate calculation rule, to obtain a position of the handheld terminal, the method further comprising:

calculating a direction vector of the handheld terminal on the basis of the calculated coordinates of the handheld terminal in the world coordinate system according to a preset direction calculation rule.

19. The handheld terminal of claim 18, wherein the preset direction calculation rule is as follows:

the direction vector of the handheld terminal is obtained through calculation by a preset camera calibration model according to the coordinates of the handheld terminal in the world coordinate system, the camera intrinsic parameters, the rotation matrix, and the translation matrix.

20. A non-transitory storage medium having a computer-executable instruction, the non-transitory storage medium being executed by one or more processors to implement the operations of: after receiving an indoor navigation instruction sent by a user, controlling a camera of a handheld terminal to obtain an image within a scope of a lens, performing data analysis on one or more barcodes of barcode labels, wherein the barcode labels are preset in a preset indoor position in the image within the scope of the lens, obtaining identifier information of each barcode label in the image within the scope of the lens, and selecting a preset quantity of color blocks from at least two barcode labels in the image within the scope of the lens according to a preset color block selection rule; calculating coordinates corresponding to each of the color blocks in a pixel coordinate system according to a position of each selected color block in the image within the scope of the lens, and calculating coordinates corresponding to each of the color blocks in a world coordinate system on the basis of preset association data of identifier information of the barcode labels and coordinates of the color blocks in the world coordinate system according to a barcode label at which each selected color block is located; and calculating coordinates of the handheld terminal in the world coordinate system on the basis of the coordinates corresponding to each of the selected color blocks in the pixel coordinate system and in the world coordinate system according to a preset coordinate calculation rule, to obtain a position of the handheld terminal.

* * * * *